US012768302B2

(12) United States Patent
Kyritsis et al.

(10) Patent No.: US 12,768,302 B2
(45) Date of Patent: Oct. 20, 2026

(54) AIRCRAFT PROPULSION SYSTEM

(71) Applicant: ROLLS-ROYCE plc, London (GB)

(72) Inventors: Vasileios Kyritsis, Derby (GB); Vasileios Pachidis, Milton Keynes (GB); Marko Bacic, Oxford (GB); Pavlos Rompokos, Cranfield (GB); Christos Mourouzidis, Cranfield (GB); Ioannis Roumeliotis, Cranfield (GB)

(73) Assignee: ROLLS-ROYCE plc, London (GB)

( * ) Notice: Subject to any disclaimer, the term of this patent is extended or adjusted under 35 U.S.C. 154(b) by 151 days.

(21) Appl. No.: 18/744,918

(22) Filed: Jun. 17, 2024

(65) Prior Publication Data

US 2026/0043351 A1 Feb. 12, 2026

(30) Foreign Application Priority Data

Jul. 6, 2023 (GR) .............................. 20230100546

(51) Int. Cl.

| | |
|---|---|
| ***F02C 7/224*** | (2006.01) |
| ***F02C 3/22*** | (2006.01) |
| ***F02C 7/32*** | (2006.01) |
| ***F02C 9/40*** | (2006.01) |

(52) U.S. Cl.

CPC ................ *F02C 7/224* (2013.01); *F02C 3/22* (2013.01); *F02C 7/32* (2013.01); *F02C 9/40* (2013.01); *F05D 2260/40311* (2013.01)

(58) Field of Classification Search

CPC .... F02C 7/224; F02C 3/22; F02C 7/32; F02C 9/40

See application file for complete search history.

(56) References Cited

U.S. PATENT DOCUMENTS 4,900,231 A * 2/1990 Kennedy ................ B64D 41/00 417/16
5,392,595 A * 2/1995 Glickstein ................. F02C 6/18 60/39.12
5,414,992 A * 5/1995 Glickstein ............... F02C 7/224 60/39.83

(Continued)

FOREIGN PATENT DOCUMENTS

EP 0 854 278 B1 2/2003
EP 4 163 481 A1 4/2023

(Continued)

OTHER PUBLICATIONS

Nov. 18, 2024 Extended Search Report issued in European Patent Application No. 24180973.0.

(Continued)

*Primary Examiner* — Ted Kim
(74) *Attorney, Agent, or Firm* — Oliff PLC

(57) ABSTRACT

An aircraft propulsion system comprises a core gas turbine engine (201) comprising a core compressor (202, 204) configured to provide core air to a core combustor (206) and a core turbine (208, 209) in fluid flow series. An auxiliary compressor (220) is provided, which is separate to the core compressor (202, 204), and configured to provide air to an auxiliary air system (218). A heat exchanger (218) is provided, which is configured to transfer heat from air from the auxiliary compressor (220) to fuel in the main fuel conduit (217) prior to provision to the core combustor (206).

6 Claims, 6 Drawing Sheets

(56) References Cited

U.S. PATENT DOCUMENTS

| | | | | |
|---|---|---|---|---|
| 9,797,311 | B2 * | 10/2017 | Suciu | F02C 7/18 |
| 10,914,242 | B2 | 2/2021 | Staubach et al. | |
| 2008/0264034 | A1 | 10/2008 | Iya et al. | |
| 2013/0040545 | A1 * | 2/2013 | Finney | B64D 13/06<br>454/71 |
| 2014/0182264 | A1 | 7/2014 | Weisgerber et al. | |
| 2015/0314229 | A1 | 11/2015 | Johnson et al. | |
| 2019/0233124 | A1 * | 8/2019 | Sharpe | F04D 13/021 |
| 2019/0353103 | A1 | 11/2019 | Roberge | |
| 2022/0099299 | A1 | 3/2022 | Carrotte et al. | |
| 2022/0252011 | A1 | 8/2022 | Rambo et al. | |
| 2024/0133343 | A1 * | 4/2024 | Palmer | F02C 3/22 |

FOREIGN PATENT DOCUMENTS

| | | | |
|---|---|---|---|
| EP | 4 286 671 | A1 | 12/2023 |
| WO | 2005/025718 | A1 | 3/2005 |

OTHER PUBLICATIONS

Jan. 15, 2024 Search Report issued in British Patent Application No. 2312780.6.

* cited by examiner

AIRCRAFT PROPULSION SYSTEM

TECHNICAL FIELD

This disclosure relates to aircraft propulsion systems powered by gas turbine engines, fuelled by cryogenic fuels.

BACKGROUND

In order to limit emissions of carbon dioxide, use of hydrogen as an alternative to hydrocarbon fuel in gas turbine engines has historically only been practical in land-based installations. However, cryogenically cooled hydrogen fuelled airliners have recently been proposed. The fuel for such aircraft however must be heated prior to combustion. Doing so in a manner which is efficient from an overall propulsion system perspective is a significant challenge.

Similar challenges occur for other cryogenically cooled gas turbine engine fuels, such as methane.

One solution is to provide a hydrogen-fuelled pre-heater, either alone or in combination with a recuperator heat exchanger. Such a system is described in applicant's previous published European patent application EP 3978736 A1. However, such systems impose significant penalties on the efficiency of the gas turbine engine, and may require additional fuel to be burnt in the pre-heater. Operation of such systems during engine transients may also be challenging, and force constraints on the design which result in sub-optimal operation at other operating conditions. Additionally, the heat exchangers in such systems are challenging to design.

SUMMARY

The invention is directed towards a propulsion system comprising a gas turbine engine and a fuel system comprising a fuel preheater for heating cryogenically-stored fuel such as hydrogen prior to injection into the gas turbine engine, as well as aircraft incorporating such propulsion systems, and methods of operating such propulsion systems.

In a first aspect, one such aircraft propulsion system comprises:

- a core gas turbine engine comprising a core compressor configured to provide core air to a core combustor and a core turbine in fluid flow series;
- an auxiliary compressor, separate to the core compressor, and configured to provide air to an auxiliary air system; and
- a heat exchanger configured to transfer heat from air from the auxiliary compressor to fuel in the main fuel conduit prior to provision to the core combustor.

Advantageously, by providing air from a separate compressor than the core compressor to the heat exchanger, provision of heat to the engine fuel can be controlled largely independently of engine operation. Such a system provides operation during transient, off-design and failure conditions, as will be described in more detail below. Additional advantages of the described arrangement are also provided.

In an embodiment, the system comprises an auxiliary burner configured to burn fuel diverted from the main fuel conduit with air from the auxiliary compressor.

In an embodiment, the auxiliary air system is configured to provide air to an aircraft environmental control system. Advantageously, the auxiliary compressor is utilised for multiple purposes, thereby reducing system complexity. Additional advantages are also associated with such a system, as described in further detail below.

In an embodiment, the auxiliary compressor is configured to receive input air from a fan stream provided by a bypass fan of the gas turbine engine. Advantageously, input pressure is substantially independent of core engine operation. Consequently, events such as a compressor surge or stall do not affect substantially affect preheater operation, and so fuel flow to the core combustor. Additionally, engine oil contamination is avoided, thereby reducing the risk of engine oil contamination of cabin air, and fire risk within the preheater.

In an alternative embodiment, the auxiliary compressor is configured to receive input air from a bleed line in fluid communication with a compressor of the gas turbine engine core. In an embodiment, the compressor is a stage of the low-pressure compressor. Advantageously, lower-pressure compressor air can be utilised compared to where the auxiliary compressor is not provided.

In an embodiment, the auxiliary compressor is configured to be driven by an electric motor. In such an arrangement, air pressure and mass flow to the auxiliary compressor is decoupled from core gas turbine engine power, allowing for improved control.

In an embodiment, the auxiliary compressor is configured to be driven by gas turbine engine core shaft.

In an embodiment, the auxiliary compressor is coupled to the gas turbine engine core shaft by a transmission system comprising a variable gear ratio gear box such as a summing epicyclic gearbox.

In an embodiment, the summing epicyclic gearbox comprises a first input comprising the gas turbine engine core shaft, a second input comprising an electric motor, and an output coupled to the auxiliary compressor, the output having a rotational speed that is a function of the difference between the speeds of the first and second inputs.

In an embodiment, the fuel is one of cryogenically stored hydrogen and methane.

In a second aspect, there is provided an aircraft comprising a gas turbine engine in accordance with the first aspect.

In a third aspect, there is provided a method of delivering cryogenically-stored fuel to a gas turbine engine comprising a core compressor, comprising:

- pumping the fuel from a cryogenic storage system through a main fuel conduit;
- pumping air via an auxiliary compressor separate to the core compressor to a heat exchanger;
- heating the fuel in the main fuel conduit by exchanging heat from the auxiliary compressor with the fuel.

In an embodiment, the method further comprises controlling the auxiliary compressor to maintain a temperature and/or mass flow of the air heated by the auxiliary compressor to a temperature required to produce a minimum heat exchanger outlet temperature.

BRIEF DESCRIPTION OF THE DRAWINGS

An embodiment will now be described by way of example only with reference to the accompanying drawings, which are purely schematic and not to scale, and in which.

DETAILED DESCRIPTION

Figure 1:
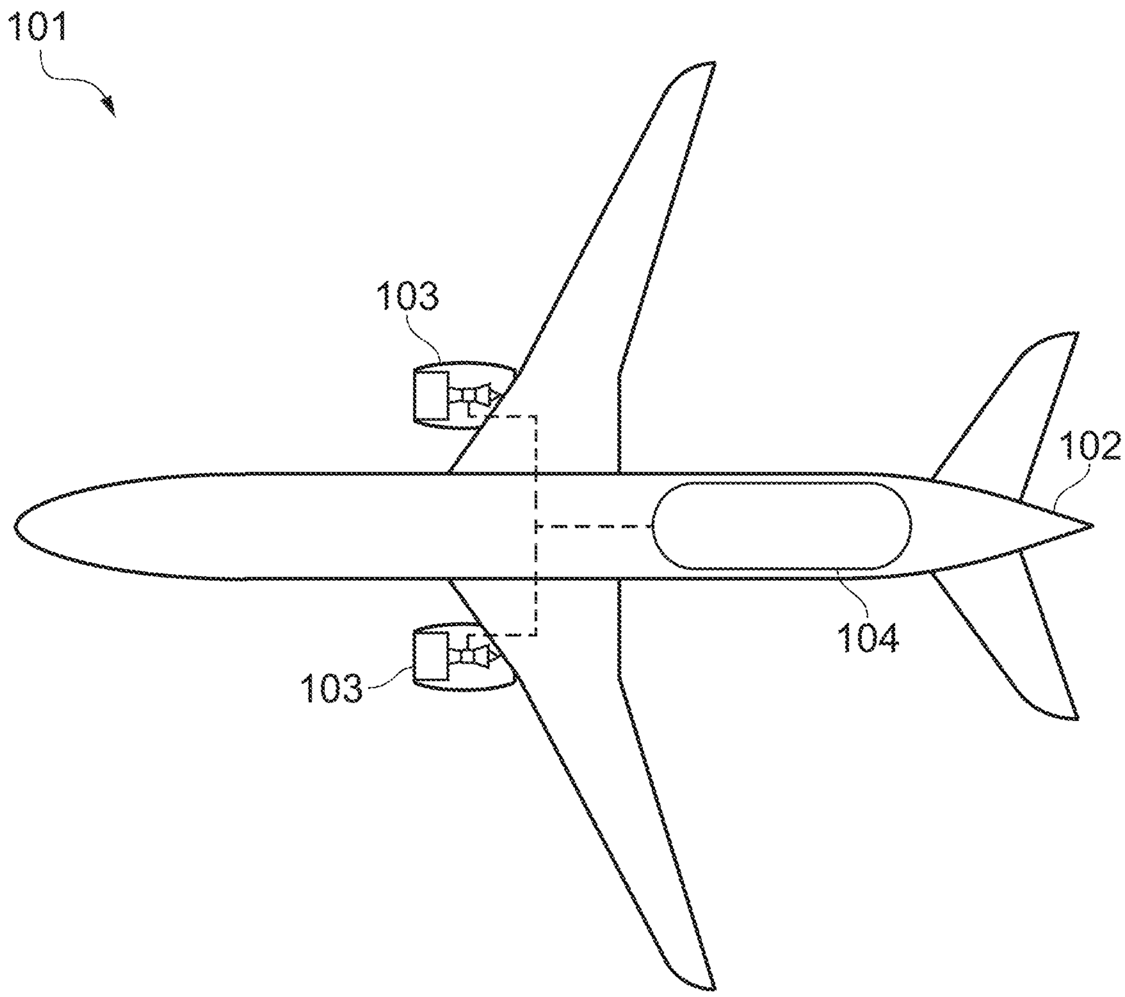
FIG. 1 shows a hydrogen-fuelled airliner comprising hydrogen-fuelled turbofan engines.

A hydrogen-fuelled airliner is illustrated in FIG. 1. In this example, the airliner 101 is of substantially conventional tube-and-wing twinjet configuration with a central fuselage 102 and substantially identical underwing-mounted turbofan engines 103. In the present embodiment, the turbofan engines 103 are geared turbofan engines.

A hydrogen storage tank 104 located in the fuselage 102. In the present embodiment, the hydrogen storage tank 104 is a cryogenic hydrogen storage tank and thus stores the hydrogen fuel in a liquid state, in a specific example at 25 kelvin. In this example, the hydrogen fuel is pressurised to a pressure from around 1 bar to around 3 bar, in a specific example 4 bar. As will be appreciated, other fuels could be used, such as methane. The fuels could be stored as either gases cooled to below ambient temperature, or as liquids.

Figure 2:
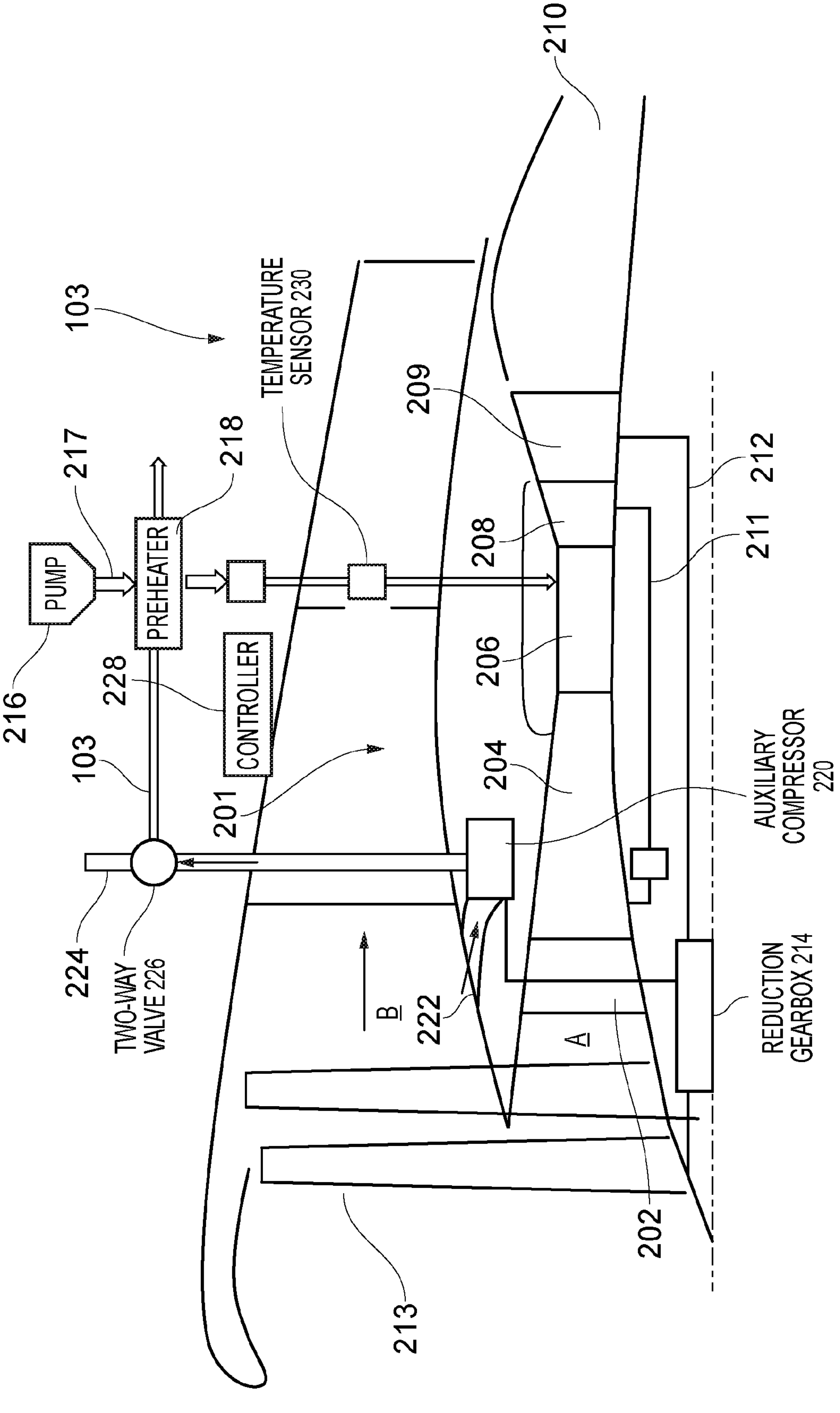
FIG. 2 is a block diagram of one of the engines of FIG. 1.

A block diagram of one of the turbofan engines 103 is shown in FIG. 2. Only an upper half of the engine is shown.

The turbofan engine 103 comprises a core gas turbine 201.

The core gas turbine 201 comprises, in fluid flow series, a low-pressure compressor 202, a high-pressure compressor 204, a combustor 206, a high-pressure turbine 208, a low-pressure turbine 209, and a core nozzle 210. The high-pressure compressor 204 is driven by the high-pressure turbine 208 via a first shaft 211, and the low-pressure compressor 203 is driven by the low-pressure turbine 209 via a second shaft 212. It will be appreciated that in alternative embodiments, the core gas turbine could be of three-shaft configuration.

As described previously, in the present embodiment, the turbofan engines 103 are geared turbofan engines. Thus in operation the low-pressure turbine 209 drives a fan 213 via a reduction gearbox 214. The reduction gearbox receives input drive from the second shaft 212 and provides output drive to the fan 213. In an embodiment, the reduction gearbox 214 is an epicyclic reduction gearbox. In a specific embodiment, it is a planetary reduction gearbox. Alternatively, it may be a star reduction gearbox, or a compound epicyclic reduction gearbox. As a further alternative, the reduction gearbox 214 could be a layshaft-type reduction gearbox or any other type of reduction gearbox. It will also be appreciated that the principles disclosed herein may be applied to a direct-drive type turbofan engine, i.e. in which there is no reduction gearbox between the low-pressure turbine and the fan.

The compressors 202, 204, combustor 206 and turbines 208, 209 define a gas turbine engine core, which operates on core flow A. The fan 213 defines a bypass flow B, which does not enter the core.

In operation, hydrogen fuel is pumped from the hydrogen storage tank 104 by a pump 216 and into a main fuel conduit 217 which ultimately delivers fuel to the combustor 206. In the present embodiment, the pump 216 is high-speed centrifugal pump. In a specific embodiment, the centrifugal pump comprises an axial inducer to minimise the required inlet pressure and to accommodate multiphase flow in addition to the centrifugal impeller for developing the majority of the required pressure rise. In an alternative embodiment, a piston-type pump could be used.

As will be appreciated, it is desirable to increase the temperature of the fuel from cryogenic storage condition to a temperature much closer to the firing temperature of the core gas turbine 201; of course this is subject to the constraint of not exceeding the autoignition temperature of the hydrogen fuel prior to admission into the combustor 207. In an example, the injection temperature is from 250 to 300 kelvin, for example 250 kelvin. In some cases, it may be desirable to increase the fuel temperature to above an icing temperature, such as 273 kelvin.

In the present embodiment, a preheater 218 is therefore provided for heating of the hydrogen fuel. In the present embodiment, this takes place between the pump 216 and the fuel injection system 206. In an embodiment, the preheater 218 is configured to raise the temperature of the hydrogen fuel to the required injection temperature. The heating may provide a phase change (for example from liquid to supercritical or to gas), or the fluid may remain in a supercritical state after heating by the preheater.

The pre-heater 218 comprises a heat exchanger configured to exchange heat between fuel in the fuel conduit 217 with heat from a heat exchange medium. The heat exchange medium comprises compressed air provided by an auxiliary compressor 220.

The auxiliary compressor 220 is separate to the core compressors 202, 204, and is typically not configured to receive core engine air. In the present embodiment, the auxiliary compressor 220 is supplied with air from the bypass flow B via an inlet duct 222.

The auxiliary compressor 220 typically comprises a centrifugal compressor, and is configured to provide compressed air to the pre-heater 218, as well as to an aircraft pneumatic system. For example, the aircraft pneumatic system may comprise an aircraft Environmental Control System (ECS), which provides conditioned, pressurised air to the aircraft cabin through an ECS supply duct 224. Together, the auxiliary compressor 220, ECS (where present) and pre-heater 218 define an auxiliary air system.

One or more valves may be provided to control airflow through the auxiliary air system. For example, a two-way valve 226 is provided, which can control the relative proportions of air flowing to the pre-heater 218 or the ECS. Total flow can be controlled by controlling the rotational speed of the auxiliary compressor 220. One or more throttle valves (not shown) may be provided to control pressure and/or mass flow.

Consequently, the system can efficiently provide pressurised and heated airflow to both the pre-heater and the aircraft pneumatic system using a single compressor, while providing the airflow at the different required pressure and flow rates of the different systems.

Figure 3:
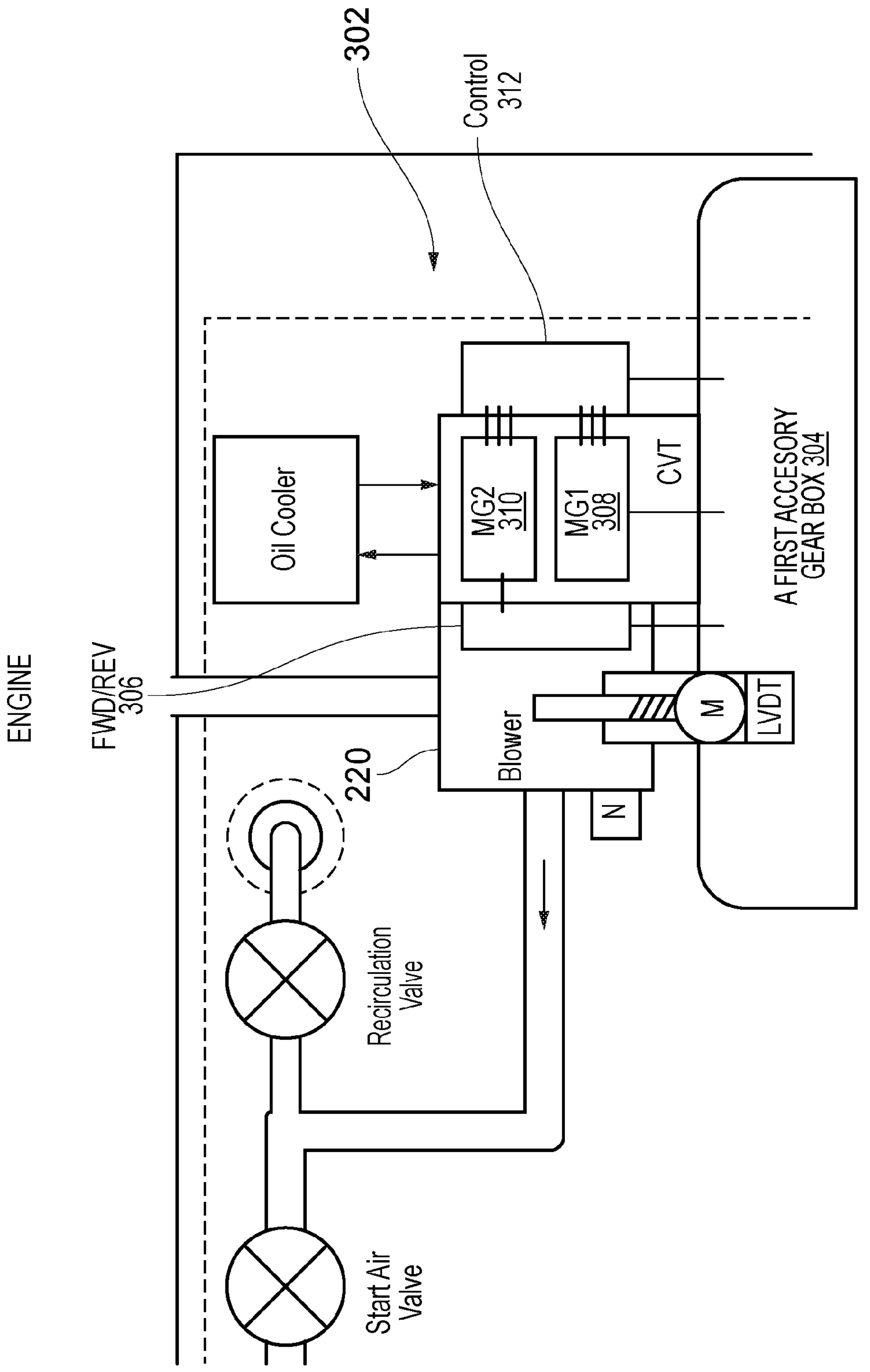
FIG. 3 is a block diagram of a transmission system for the auxiliary compressor of the engine of FIG. 2.

In the present embodiment, the compressor 220 is driven by the core engine via a transmission system 302. Details of the transmission system 302 are shown in FIG. 3.

The transmission system 302 comprises a first accessory gearbox 304 operatively coupled between one of the low or high-pressure compressor 202, 204 of the gas turbine engine core 103, and a summing gearbox 306 in the form of an epicyclic gearbox to provide a first mechanical input into the summing epicyclic gearbox 306. In the described embodiment, the transmission system is coupled to the low-pressure shaft 212, in view of the higher inertia of this system, for reasons that will be explained below.

The fuel system transmission system 302 comprises a first electrical machine 308 connected to the first accessory gear box 304. The first electrical machine 308 is configured to convert mechanical power from the first accessory gear box 304 into electrical power, and so acts as a generator. The first electrical machine 308 is configured to provide this electrical power to a second electrical machine 310 which is configured to convert the electrical power (from the first electrical machine 308) to mechanical power (i.e. act as a motor) to provide a second mechanical input into the summing gear box 306.

The system also comprises a power management system 312 to control the transfer of electrical power between the first and second electric machines 308, 310.

The summing epicyclic gearbox 306 has an output that is a function of the difference between the speeds of the first and second inputs, which is coupled to the compressor/blower 220. The second input is a continuously variable positive or negative input (as a result of the control by the power management system 312) which can be used to increase or decrease the compressed air output of the fuel system compressor as desired and as required by operating conditions. Optionally, additional electrical power may be provided to the motor 310, to drive the auxiliary compressor 220 at higher speeds where necessary.

Accordingly, the compressor 220 is driven mechanically by one of the gas turbine engine core shafts 211, 212, while its speed is controlled electrically by the controller 312 and electric machines 308, 310.

As will be appreciated, the heat transferred between the compressed air and the hydrogen fuel in the heat exchanger will be a function of the compressed air temperature, its flow rate, and its pressure. In general, as pressure increases, so does temperature and density, as well as potentially mass flow rate. Consequently, heat transfer will generally increase with increasing compressor rotational speed.

As such, a system controller 228 is provided, which controls auxiliary compressor 220 rotational speed and valve 226 position in accordance with heat input demand.

In one example, the system is controlled to provide a required minimum heater output temperature. A temperature sensor 230 is provided, which detects fuel temperature in the conduit 217 downstream of the heater 218. The controller 228 controls both the valve 226 to direct sufficient compressor air, and the compressor 220 to produce sufficient pressure rise, flow rate and temperature, such that the required minimum fuel temperature is met. Such a control system is known as a "closed loop" system. Alternatively, an open loop or model-based control strategy could be employed, based on parameters such as engine fuel flow demand.

The control system may also take into account ECS pressure, mass flow and temperature requirements, and control the auxiliary compressor 220 and valve 226 such that both requirements are met.

Additional control strategies may also be employed for transitory conditions or excursions.

For example, the target fuel temperature may be increased in advance of sudden fuel flow demand increases. Consequently, thermal inertia of the system is taken into account, thereby ensuring minimum temperatures are met at all times.

A number of advantages are associated with the described arrangement.

For example, the system does not rely on compressor bleed air for its operation, and consequently, engine compressor margin is largely unaffected by preheater operation. The auxiliary compressor receives low-pressure air from the bypass duct, with the advantage of avoiding cabin air contamination during starting. Given the relatively large heating requirement for the pre-heater (particularly where the fuel comprises liquid hydrogen), relatively large air mass flows and pressures are required to provide sufficient air for combustion within the pre-heater, to in turn provide sufficient heating to the fuel.

An additional advantage of this approach is the low-pressure air produced by the auxiliary compressor 220. In view of this, the preheater 218 residual pressure ratio and hence energy at the exhaust of the preheater is reduced relative to systems that incorporate core compressor bleed air, and can be conducted via the existing ventilation system and relevant nozzle, without the addition of any energy-recovery system at the preheater sink.

A further additional benefit to the proposed arrangement is the behaviour of the cabin-blower and preheater system in the case of a core compressor 202, 204 surge. In such an event, the core compressor 202, 204 will experience sudden drop in pressure and flow reversal, which would result in reduced preheater operation where the preheater is sourced with gas turbine engine core compressor bleed air. In the present disclosure, where the preheater 218 is sourcing air from the auxiliary compressor, the drop in air-pressure relative to its nominal value is significantly smaller during the first seconds of a surge, as the fan 213 is still rotating at significant speed given the large inertia of the low-pressure system. The auxiliary compressor 220 will also not cease operation in case of a short-lived core compressor surge, due to the low-pressure shaft 212 inertia, hence maintaining preheater air supply during a surge and the following surge recovery procedure. In effect, the removal of this consideration from the design specification of the pre-heater system may result in reduced overall heating requirements and/or thermal mass of the system.

An additional benefit of sourcing air for the preheater 218 from the auxiliary compressor 220, is that the air supplied can be of variable pressure for a fixed fan 213 or high-pressure compressor 204 speed. Such is the case during descent & approach, when the engine is operating at descent and approach idle rotational speeds. As the aircraft is descending to lower altitudes, the load to the auxiliary compressor 220 for the purposes of ECS provision is proportionally smaller as the ambient pressure increases. The increasing margin in auxiliary compressor 220 power can be used instead for additional heat generation in the preheater 218, as a means of priming the fuel system for a potential aborted landing and take-off go-around (TOGA) manoeuvre. That is achieved by the continuous variable transmission of the cabin blower, which can spool up independently for a fixed low-pressure shaft 212 speed.

A similar benefit of the described system, also applies in the case of windmill operation and windmill relights. The described system combines the sustained fan speed and the continuously variable transmission ratio capability of the auxiliary compressor 220, and is expected to provide significantly higher air pressure to the preheater system in the event of a windmill relight.

Figure 4:
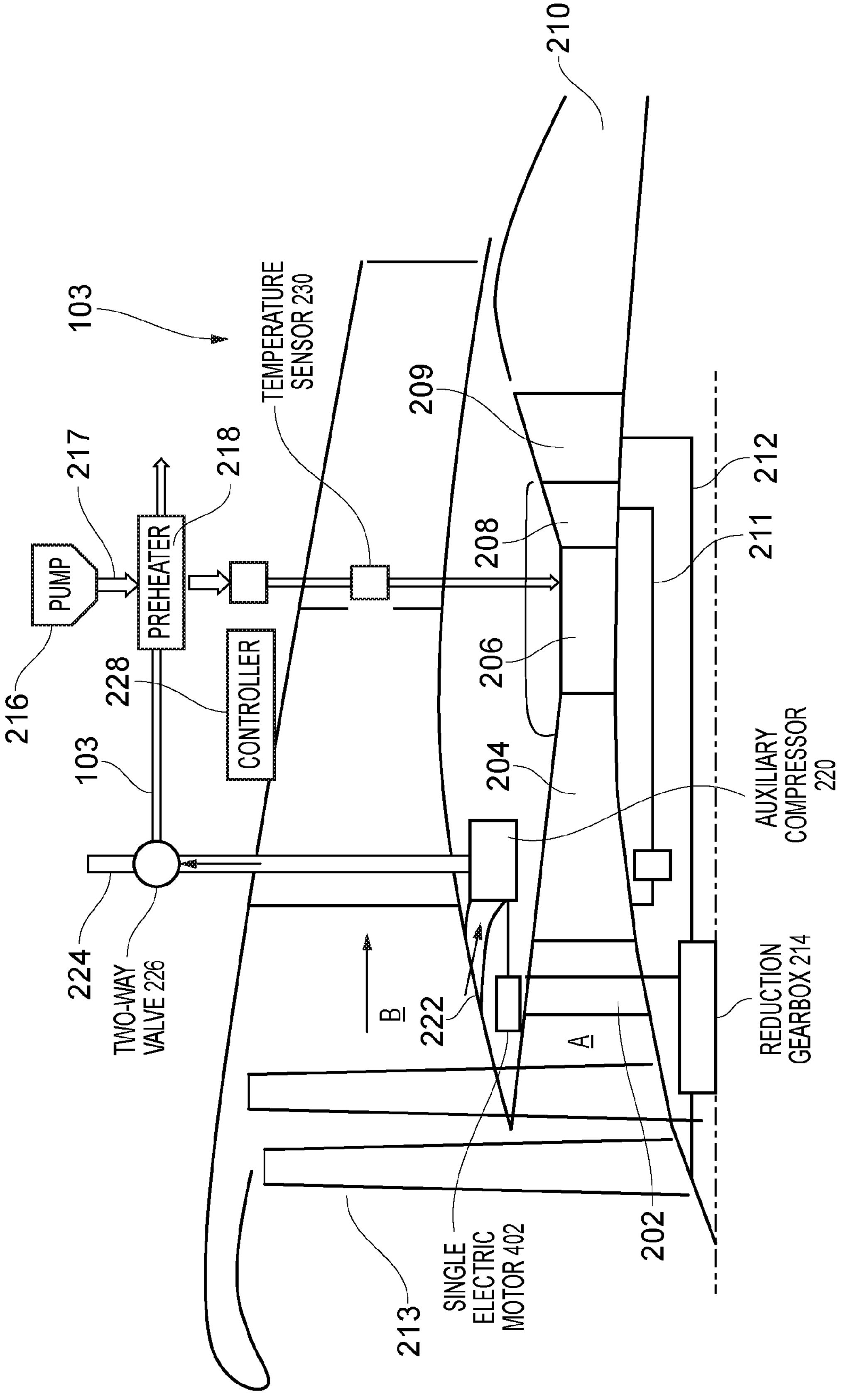
FIG. 4 is a block diagram of one of the engines of FIG. 1 having an alternative fuel system

FIG. 4 illustrates a further embodiment of the described disclosure.

In this system, the auxiliary compressor 220 is powered by a single electric motor 402, in place of the transmission system. As such, the system can be controlled with a high degree of independence of core engine operation.

Figure 6:
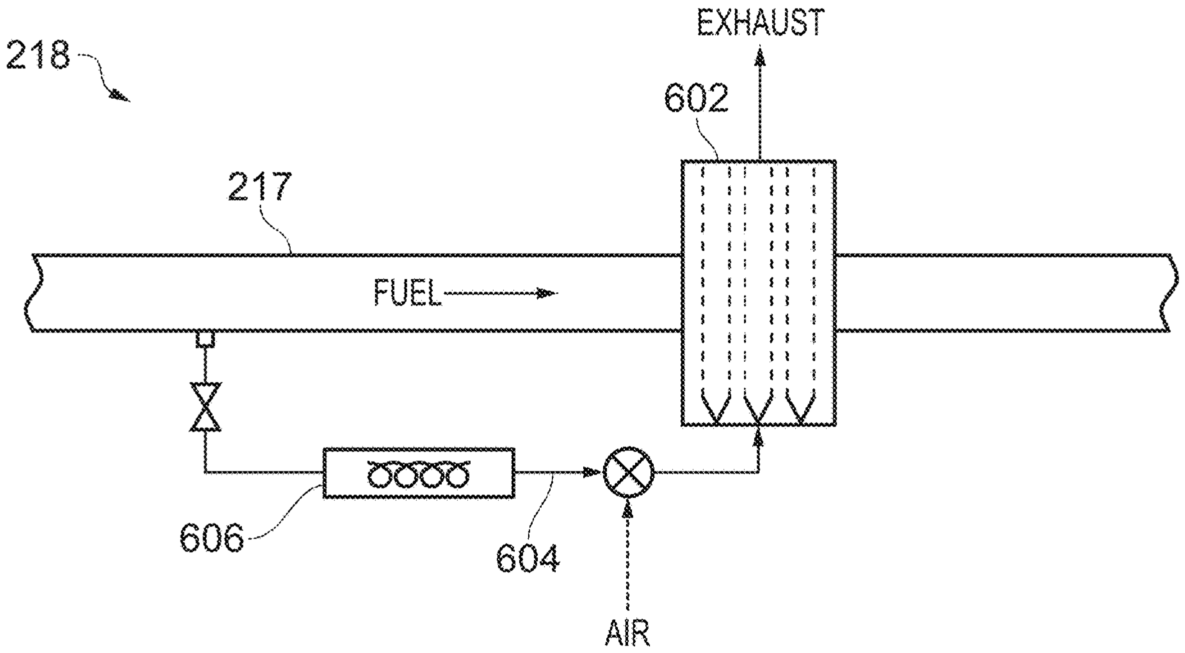
FIG. 6 is a block diagram of a preheater of the fuel system of FIG. 4.

Additional changes are also embodied in the system of FIG. 4. Referring to FIG. 6, the pre-heater 218 includes an auxiliary combustor 602, which combines the compressed air from the auxiliary air compressor 220 with fuel diverted from the fuel conduit 217 through an auxiliary fuel conduit 604, and combusts it to raise its temperature. A further electrical heater 606 may also be provided. The combustion gases are fed to a heat exchanger, which heat the remainder of the hydrogen fuel in the fuel conduit 217.

In such a system, additional heat can be provided to the fuel, where the compressed air provided by the auxiliary compressor 220 is insufficient by itself.

Such a system presents additional advantages compared to one where the air for the pre-heater combustor is provided from the core compressors 202, 204. For example, where the core compressor 202, 204 suffers a stall or surge, insufficient air flow or pressure may be available for the preheater combustor to operate. In such a case, a flameout may occur, which would require relight before fuel could be supplied to the main combustor 206. Such a process would extend the time required for recovery from a stall, which may cause unacceptable risks. Consequently, the system provides a more robust system, with increased safety margins.

Figure 5:
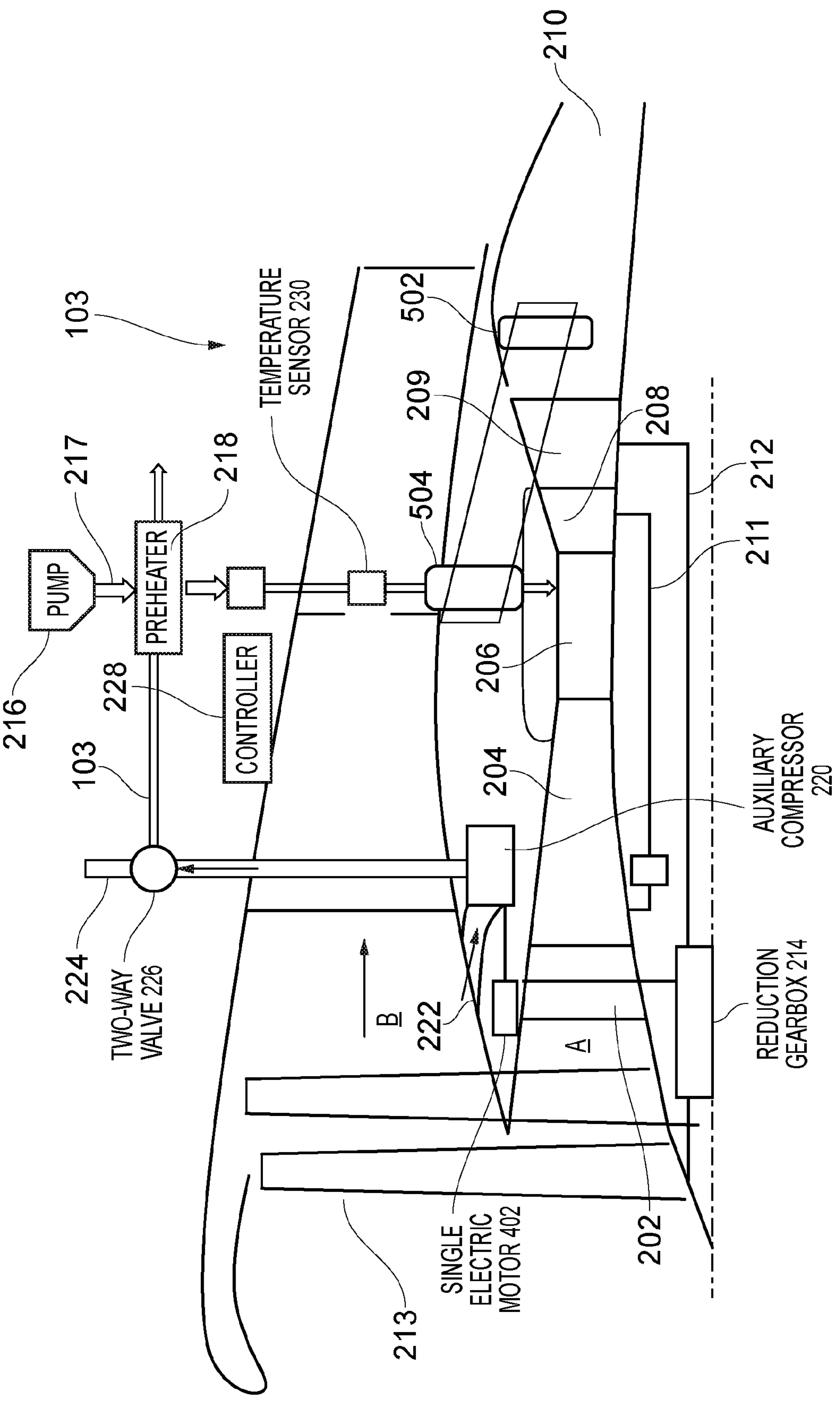
FIG. 5 is a block diagram of one of the engines of FIG. 1 having a still further alternative fuel system.

FIG. 5 illustrates a still further embodiment of the present disclosure.

In this embodiment, a recuperator system is provided, having a first heat exchanger 502 provided in core exhaust flow. The recuperator heat exchanger 502 is configured to exchange heat between engine core gases downstream of one or more turbine stages 208, 209, and transfer this heat to a heat transfer fluid. In some embodiments, the heat transfer fluid may be hydrogen in the main fuel conduit 217. However, in the embodiment shown in FIG. 5, an intermediate heat transfer fluid may be provided, which is in turn provided to a second fuel heat exchanger 504, which heats fuel in the main fuel conduit 217. In either case, heat from the core exhaust is typically transferred to the hydrogen fuel downstream of the pre-heater 218.

It will be appreciated that features of the embodiments of FIGS. 2 and 3 can be combined with features of the embodiments of FIGS. 4 and 5. For example, the electric motor driven auxiliary compressor could be combined with the heat exchanger 218 of FIG. 2. Similarly, the auxiliary combustor 502 of FIG. 5 could be combined with the gearbox driven auxiliary compressor of FIG. 3.

Various examples have been described, each of which comprise various combinations of features. It will be appreciated by those skilled in the art that, except where clearly mutually exclusive, any of the features may be employed separately or in combination with any other features and thus the disclosed subject-matter extends to and includes all such combinations and sub-combinations of the or more features described herein.

For example, relative positioning of components could be altered. The fuel pump could be located downstream of the preheater or the recuperator heat exchanger, configured to operate on gaseous hydrogen.

The auxiliary compressor could draw air from a different source. For example, a main gas turbine engine core compressor bleed could be provided, with the auxiliary compressor being provided with air from this source. In such a case, a relatively low-pressure stage could be employed, such as a stage of the low-pressure compressor 202.

The invention claimed is:

1. An aircraft propulsion system comprising:
- a core gas turbine engine comprising a core compressor configured to provide core air to a core combustor and a core turbine in fluid flow series;
- an auxiliary compressor, separate to the core compressor, and configured to provide air to an auxiliary air system and the auxiliary compressor is not configured to receive the core air; and
- a heat exchanger configured and arranged to transfer heat from air from the auxiliary compressor to fuel in a main fuel conduit prior to provision to the core combustor;
- wherein:
  - the auxiliary air system is configured to provide air to an aircraft environmental control system,
  - the auxiliary compressor is configured to receive input air from a fan stream provided by a bypass fan of the gas turbine engine,
  - the auxiliary compressor is coupled to a core shaft of the gas turbine engine by a transmission system comprising a variable gear ratio gearbox such as a summing epicyclic gearbox,
  - the transmission system is disposed between the auxiliary compressor and the summing epicyclic gearbox, and
- the summing epicyclic gearbox comprises:
  - a first input comprising the gas turbine engine core shaft,
  - a second input comprising an electric motor, and an output coupled to the auxiliary compressor, the output having a rotational speed that is a function of a difference between the speeds of the first input and the second input.

2. An aircraft propulsion system according to claim 1, wherein the system comprises an auxiliary burner configured to burn fuel diverted from the main fuel conduit with air from the auxiliary compressor.

3. An aircraft propulsion system according to claim 1, wherein the fuel is either cryogenically stored hydrogen or cryogenically stored methane.

4. An aircraft comprising a gas turbine engine in accordance with claim 1.

5. A method of delivering cryogenically-stored fuel to a gas turbine engine comprising a core compressor, comprising:
- pumping the fuel from a cryogenic storage system through a main fuel conduit;
- pumping air via an auxiliary compressor separate to the core compressor to a heat exchanger, the auxiliary compressor is not configured to receive core air; and
- heating the fuel in the main fuel conduit by exchanging heat from the auxiliary compressor with the fuel via the heat exchanger,
- wherein:
  - an auxiliary air system is configured to provide air to an aircraft environmental control system,
  - the auxiliary compressor is configured to receive input air from a fan stream provided by a bypass fan of the gas turbine engine,
  - the auxiliary compressor is coupled to a core shaft of the gas turbine engine by a transmission system comprising a variable gear ratio gearbox such as a summing epicyclic gearbox,
  - the transmission system is disposed between the auxiliary compressor and the summing epicyclic gearbox, and
- the summing epicyclic gearbox comprises:
  - a first input comprising the gas turbine engine core shaft,
  - a second input comprising an electric motor, and an output coupled to the auxiliary compressor, the output having a rotational speed that is a function of a difference between the speeds of the first input and the second input.

6. A method according to claim 5, wherein the method further comprises controlling the auxiliary compressor to maintain a temperature of the air heated by the auxiliary compressor and/or mass flow of the air heated by the auxiliary compressor to a temperature required to produce a minimum heat exchanger outlet temperature of the air heated by the auxiliary compressor.

* * * * *